United States Patent
Irzyk

(10) Patent No.: US 10,042,162 B2
(45) Date of Patent: Aug. 7, 2018

(54) DEVICE AND METHOD FOR EMITTING A LIGHT BEAM INTENDED TO FORM AN IMAGE, PROJECTION SYSTEM, AND DISPLAY USING SAID DEVICE

(71) Applicant: Valeo Études Électroniques, Créteil (FR)

(72) Inventor: Michael Irzyk, Créteil (FR)

(73) Assignee: Valeo Etudes Electroniques, Creteil (FR)

( * ) Notice: Subject to any disclaimer, the term of this patent is extended or adjusted under 35 U.S.C. 154(b) by 3 days.

(21) Appl. No.: 14/414,904

(22) PCT Filed: Jul. 16, 2013

(86) PCT No.: PCT/FR2013/000185
§ 371 (c)(1),
(2) Date: Jan. 15, 2015

(87) PCT Pub. No.: WO2014/013142
PCT Pub. Date: Jan. 23, 2014

(65) Prior Publication Data
US 2015/0177515 A1    Jun. 25, 2015

(30) Foreign Application Priority Data

Jul. 18, 2012 (FR) .................................... 12 02039

(51) Int. Cl.
*G02F 1/01* (2006.01)
*G02B 27/01* (2006.01)
(Continued)

(52) U.S. Cl.
CPC ............ *G02B 27/0101* (2013.01); *G02B 5/30* (2013.01); *G02B 27/281* (2013.01);
(Continued)

(58) Field of Classification Search
CPC ............ G03B 21/2053; G03B 21/2033; G03B 21/2073; G03B 33/12; G03B 21/208;
(Continued)

(56) References Cited

U.S. PATENT DOCUMENTS 5,125,737 A * 6/1992 Rodriguez ......... G01N 15/1459
356/338
5,321,789 A * 6/1994 Kida ....................... G02B 6/06
348/E5.141
(Continued)

FOREIGN PATENT DOCUMENTS

DE       10 2008 054 443 A1    7/2009
DE          102008054443 A1 *  7/2009 ............. B60K 35/00
(Continued)

OTHER PUBLICATIONS

International Search Report for corresponding International Application No. PCT/FR2013/000185, dated Sep. 27, 2013 (6 pages).

*Primary Examiner* — Bumsuk Won
*Assistant Examiner* — Balram Parbadia
(74) *Attorney, Agent, or Firm* — Osha Liang LLP

(57) ABSTRACT

The invention concerns a device for emitting a light beam (10) intended to form an image, the device comprising one or more sources (4, 5, 6), each emitting a laser-type beam (7, 8, 9), the device being configured to form the light beam (10) from the one laser beam or from the combination of laser beams (7, 8, 9), the device comprising attenuation means (12) disposed downstream of the source(s) (3, 4, 5), enabling the optical power of the light beam (10) to be varied.

15 Claims, 2 Drawing Sheets

Figure 1:
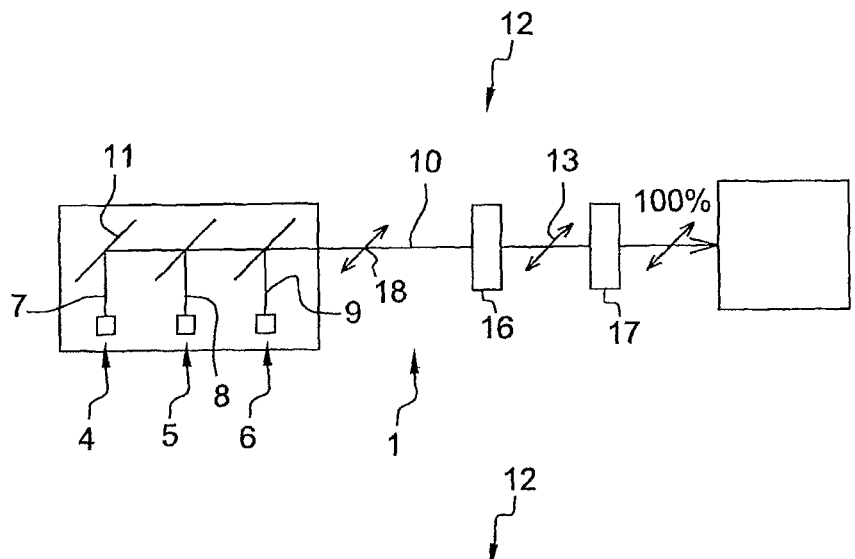

(51) Int. Cl.
  *G02B 27/28*  (2006.01)
  *G02B 5/30*   (2006.01)
  *G02F 1/13*   (2006.01)
  *G09G 3/02*       (2006.01)

(52) U.S. Cl.
  CPC .......... *G02F 1/0136* (2013.01); *G02F 1/1313* (2013.01); *G02B 2027/0118* (2013.01); *G09G 3/02* (2013.01); *G09G 2380/10* (2013.01); *G09G 2380/12* (2013.01)

(58) Field of Classification Search
  CPC ........ G02B 2027/0118; G02B 27/0101; G02B 27/01; G02B 27/281; G02B 26/02; G02B 27/106; G02B 27/283; G02B 5/30; G02B 6/12004; H04N 9/3155; H04N 5/57; H04N 5/74; H04N 9/3161; G02F 1/01
  See application file for complete search history.

(56) References Cited

U.S. PATENT DOCUMENTS

| | | | | |
|---|---|---|---|---|
| 7,226,172 | B2 * | 6/2007  | Robinson | G02B 27/281 348/E5.119 |
| 7,317,403 | B2 * | 1/2008  | Grootes  | H05B 33/0815 340/815.45 |
| 7,817,324 | B2   | 10/2010 | Drumm    | |
| 2007/0070301 | A1 * | 3/2007  | Engle    | G02B 5/205 353/84 |
| 2008/0100804 | A1 * | 5/2008  | Kanayama | G02B 27/283 353/20 |
| 2008/0297876 | A1 * | 12/2008 | Drumm    | G03B 21/20 359/238 |
| 2009/0015796 | A1 * | 1/2009  | Maeda    | G03B 33/12 353/20 |
| 2009/0086111 | A1   | 4/2009  | Inoue et al. | |
| 2009/0195700 | A1 * | 8/2009  | Yun      | H04N 9/3129 348/723 |
| 2010/0315597 | A1 * | 12/2010 | Powell   | G02B 26/08 353/20 |
| 2011/0182065 | A1 * | 7/2011  | Negley   | F21V 5/04 362/231 |
| 2012/0013855 | A1 * | 1/2012  | Lescure  | G02B 26/101 353/81 |
| 2012/0105812 | A1 * | 5/2012  | Dekker   | G03B 21/2033 353/31 |

FOREIGN PATENT DOCUMENTS

| | | |
|---|---|---|
| EP | 0 398 346 A2   | 11/1990 |
| WO | 2005/121707 A2 | 12/2005 |

* cited by examiner

DEVICE AND METHOD FOR EMITTING A LIGHT BEAM INTENDED TO FORM AN IMAGE, PROJECTION SYSTEM, AND DISPLAY USING SAID DEVICE

The invention relates to a device and a method for emitting a light beam intended to form an image, a projection system using said device and a display using said system.

The invention will have applications, for example, in motor vehicles for informing the users of the vehicle, in particular its driver.

It is known to equip a motor vehicle with a so-called head up display system. Such a system is placed in the field of vision of the motor vehicle driver and displays information relating to the status of the motor vehicle, the traffic or other.

In order not to interfere with driving, it is necessary that the brightness of the projected image is adapted to the ambient brightness. In particular, it is necessary that the optical power of the projected image is greatly different during a daytime journey and a journey at night or when passing through a tunnel.

With head up displays using light emitting diodes, it has already been proposed to vary the brightness of the projected image by controlling the supply current of the diodes. Such devices allow a satisfactory adaptation of the brightness. However, their daytime brightness remains inadequate.

In order to compensate for this defect, displays are known which use light sources of the laser type. However, the adaptation of the brightness provided in such a case by controlling the amount of current supplying the sources does not make it possible to sufficiently reduce the optical power of the image. By way of example, if it is considered that it is desired to have an optical power of the order of 10000 Cd/m2 in daytime driving condition and of the order of 5 Cd/m2 in night driving conditions, it is observed that it is necessary to reduce the brightness by a factor of 2000 when changing from one of the driving conditions to the other.

Research conducted by the applicant on adapting the brightness of the projected image by controlling the current supply of the light sources, for example using pulse width modulation technologies or control of the amplitude of the current used, shows that these technologies have limits. It is notably necessary to have a minimum pulse duration and a minimum amplitude of the current for the linear operation of the diodes.

The purpose of the invention is to solve the above problems by proposing a device for emitting a light beam intended to from an image, said device comprising one or more sources, each emitting a beam of the laser type, said device being configured to form said light beam from the one laser beam or by bringing said laser beams together by combination. "Bringing together" means that, to the naked eye, said laser beams form, after combination, a single light beam even though they are still present individually in said beam. For the purpose of simplicity, the term "light beam" will continue being used hereafter to denote the combination of the laser beams after bringing them together.

According to the invention, said device comprises attenuation means, situated downstream of said source or sources, making it possible to vary the optical power of the light beam. The term "optical power" means the light power of the light flux emitted by the source or sources. It can equally well be measured for example in milliwatts (mW), from the current generated by a photodiode receiving the light flux, or in candela per square meter (Cd/m2), or from the illumination produced by the light flux on a given area.

By attenuating the light beam emitted by the laser sources by specific means operating in a way other than by controlling their current supply, greater possibilities are available for reducing the optical power. Consequently, it is possible to simultaneously benefit from high daytime brightness and low brightness at night.

According to one aspect of the invention, the strongly polarized nature of the beams emitted by light sources of the laser type is exploited by making provision for said attenuation means to be configured to vary the optical power of the light beam as a function of an orientation of a polarization of the laser beam or beams.

According to a first variant of this aspect of the invention, said attenuation means comprise means of modification of the orientation of the polarization of said beam or beams and, downstream, an analyzer, in particular a fixed analyzer, transmitting only one component of the polarization of said beam or beams. Said means of modification of the orientation of the polarization comprise, for example, liquid crystal means. A system is thus obtained which does not necessitate the use of moving parts.

According to another variant of this aspect of the invention, said attenuation means comprise an analyzer transmitting only one component of the polarization of said beam or beams and means of modification of the orientation of said analyzer making it possible to vary a proportion of the components of the polarization of said transmitted beam or beams.

In one or other of these variants, said analyzer is, for example, a polarizing film or structure.

According to another aspect of the invention, which can be combined with the preceding one, said emission device can comprise means of control of the current supply of said sources, said control means being configured to provide additional adjustment of the optical power of said light beam. In this way the capabilities of adjustment of the optical power provided by the attenuation means and by the control means are combined in order to achieve the desired attenuation factor, in particular at least 1000, or even 2000.

Said control means can be configured to provide linear current regulation of the optical power of said laser beams in order to provide a choice of color of the light beam according to a proportion of optical power allocated to each of said laser beams. In this way a method of regulation dedicated to choice of color is available.

Said control means can also be configured to provide regulation by pulse width modulation of the optical power of said laser beams in order to achieve said additional adjustment of the optical power of said light beam. In this way a method of regulation dedicated to the additional adjustment of the optical power is available. In other words, the attenuation factor can result from the combined action of said attenuation means and a pulse width modulation of the supply current of said laser sources, said modulation being carried out using said control means.

More precisely, said control means are configured so that said pulse width modulation regulation provides said additional adjustment, for example, according to an attenuation factor of between 5 and 20, notably of 10. As for the attenuation means, these can make it possible to obtain an attenuation factor of between 100 and 300, notably of about 200.

According to other features of the invention which can be taken together or separately, possibly combined with all at parts of the preceding features:

said attenuation means are configured to vary the optical power of the at least one of said laser beams before its combination with at least one of said other laser beams, said attenuation means are configured to vary the optical power of said light beam coming from the combination of said laser beams, said device comprises means of indexing the orientation of the polarization of the laser beam or beams, said sources have the same indexing, said attenuation means are configured to operate taking account of said indexing, said device furthermore comprises means of detecting ambient brightness and processing means making it possible to act on said attenuation means as a function of the ambient brightness detected by said detection means.

Advantageously, said emission device comprises at least three laser sources, each one of the three sources being capable of emitting a monochromatic light beam.

This being so, the invention also relates to an image projection system comprising a device for the emission of a light beam such as described above.

Said system comprises, for example, means for forming an image from said light beam. Said attenuation means can be situated upstream and/or downstream of said image forming means.

Said image forming means comprise, for example, a diffuser screen upon which is formed an image produced from the light source or sources of said emission device.

According to a first implementation, said image forming means furthermore comprise a laser scanning projector generating a light beam forming an image on the diffuser screen from the light beam generated by said emission device.

According to another embodiment, said image forming means comprise a projector comprising an array of micromirrors interposed between the light source or sources and the diffuser screen, the array of micromirrors forming a first projected image on the diffuser screen where a second projected mage is formed.

The invention also covers a head up display system comprising a projection system such as described above.

Such a system comprises, for example, a semi-reflecting plate, able to be disposed between the steering wheel and the windscreen of a vehicle, or the windscreen as such.

The system according to the invention can furthermore comprise a reflecting device interposed in the path of the image between the diffuser screen and the semi-reflecting plate. Such a reflecting device makes it possible to install the projection device more easily whilst sending the image to the desired place from a given location of the emission device.

The invention also relates to a method for emitting a light beam intended for forming an image, in which method there is provided one or more sources, each one emitting a beam of the laser type, said light beam is formed from the one laser beam or by bringing together said laser beams by combination and the optical power of said light beam is varied using attenuation means situated downstream of said source or sources.

It will also be possible to provide additional adjustment of the optical power of said light beam using means for controlling the current supply of said source or sources, notably according the features already described above.

Advantageously, said method uses the emission device described above.

Figure 2:
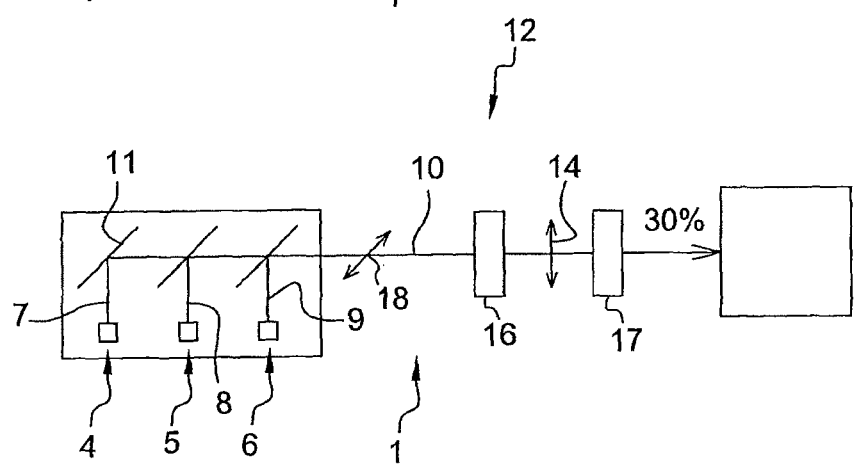
Figure 3:
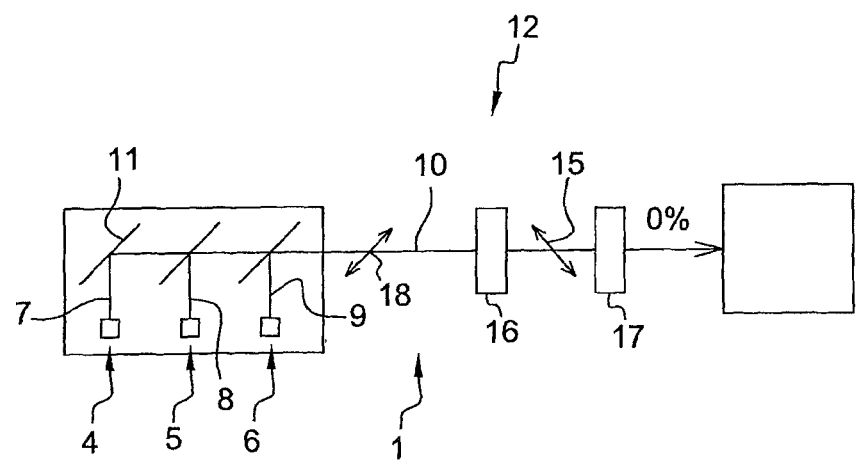
Figure 4:
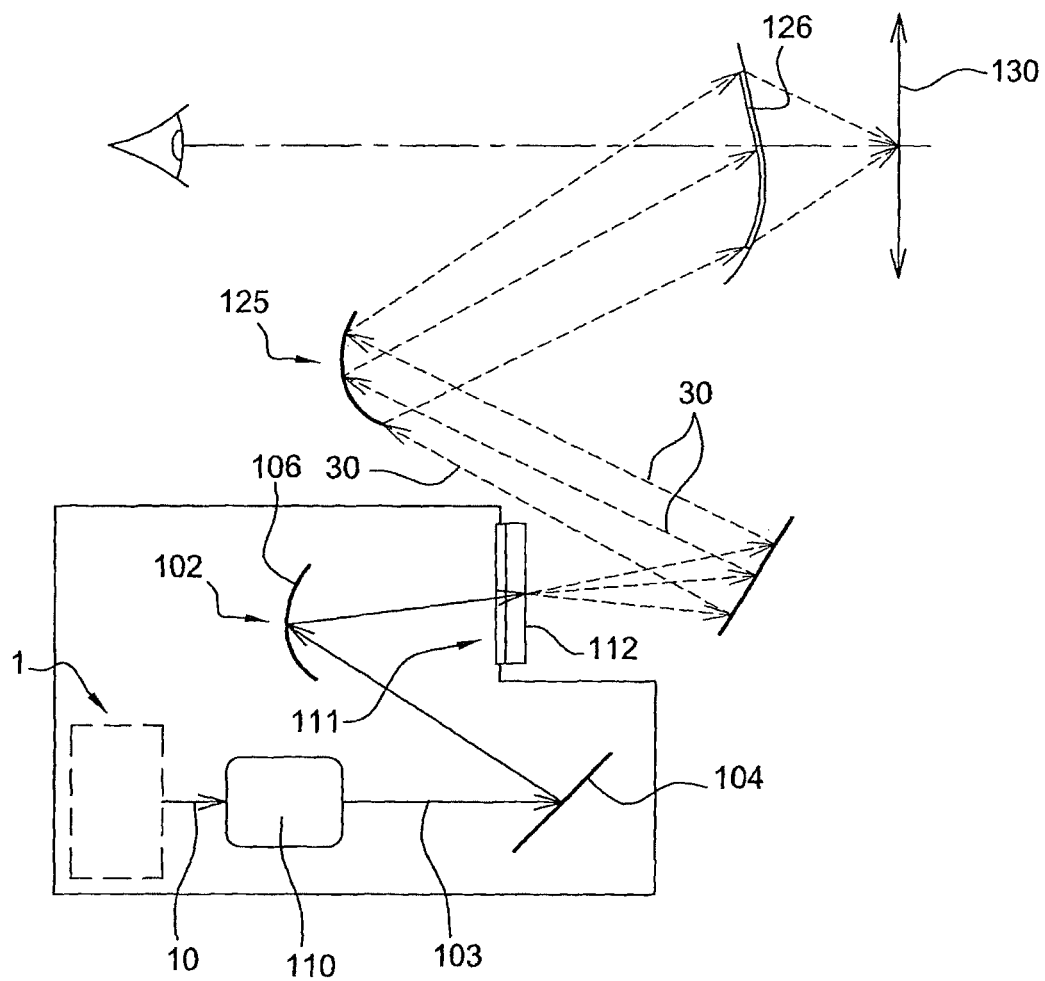

Other features, details and advantages of the invention will emerge more clearly on reading the description given hereafter as an indication and with reference to the drawings in which:

FIG. 1 is a diagrammatic view of an emission device according to the invention, in a first operating mode, FIG. 2 is a view of the device shown in FIG. 1 in a second operating mode, FIG. 3 is a view of the device shown in FIG. 1 in a third operating mode, FIG. 4 is a diagrammatic view of a head up display system according to the invention.

It should be noted that the figures disclose the invention in a detailed manner in order to use the invention, it being possible of course for said figures to be used for better defining the invention as necessary.

As shown in FIGS. 1 to 3, the invention firstly relates to a device 1 for emitting a light beam, intended to form an image. Such a device is more particularly intended to equip a head up display of a motor vehicle, where at least one item of information related to the vehicle is projected.

Said device comprises one or more sources 4, 5, 6 each emitting a beam 7, 8, 9 of the laser type. They are, for example, laser sources, typically laser diodes, each laser source emitting a monochromatic beam, that is to say consisting of a single color.

Said device here comprises a plurality of sources 4, 5, 6, three of them in this case, said device being configured to form the light beam 10 by bringing the beams 7, 8, 9 individually emitted by each of said sources 4, 5, 6 together in combination. More precisely, it will be possible for the sources to be ones emitting a different color from one source to another. The colors are, for example, red, green or blue (RGB).

The optical power of each of the sources is controlled independently, by using the supply current of the laser source or sources. At a given optical power, the color of the light beam 10 is determined by the way in which a power ratio is established between the different laser diodes. For example, in order to obtain white light, the optical powers, in proportion, must be established according to the following distribution: 60 for the green diode, 30 for the blue diode, 10 for the red diode. As described below, the optical power of each of the sources can also be controlled in order to modulate the optical power of the light beam 10.

The beams 7, 8, 9 emitted by each of the sources are oriented, for example, parallel with each other and reflect in the same direction in order to form said common light beam 10 by combination. To this end, said device 1 here comprises optical elements that are semi-transparent, over a range of wavelengths, such as dichroic mirrors or combining plates 11, intercepting the beams 7, 8, 9 emitted by each of said sources and combining them in the direction of said beam 10.

More generally, said device 1 is configured to form said light beam 10 from said laser beam or beams 7, 8, 9, however many sources 4, 5, 6 may be involved. In the case of a single source, the light beam 10 is composed of the laser beam emitted by the single source used and the image obtained will then be monochromatic, composed of the different optical powers applied to each of the points forming it, according to a gradation of said color. In the case of a plurality of sources, typically the three sources 4, 5, 6 mentioned above, said common beam 10 which then forms said light beam will allow the establishment of an image according to a color spectrum whose resolution will correspond to the fineness of control of the power supply of said sources 4, 5, 6.

According to the invention, said device 1 comprises attenuation means 12, situated downstream of said source or sources 4, 5, 6, making it possible to vary the optical power of the light beam 10. In other words, a color and/or an intensity being conferred on the light beam 10 by controlling the current supply of the sources, said attenuation means 12 make it possible to vary the optical power of the beam or beams 7, 8, 9, 10. In particular, it will be possible to adapt the optical power of the beam to daytime driving conditions and to night driving conditions.

Said device can comprise means of controlling the current supply of said sources. As mentioned above, they make it possible to choose the color of the light beam 10.

More precisely, said control means are configured, for example, to provide linear current regulation of the optical power of said laser beams 7, 8, 9 in order to provide said choice of color of the light beam 10, according to a proportion of optical power allocated to each of said laser beams 7, 8, 9. It is possible, for example, to provide an encoding of the color in six bits, corresponding to sixty four levels of optical power for each of said laser beams 7, 8, 9.

Said control means can also be configured to provide an additional adjustment of the optical power of said light beam. A particularly high attenuation rate can be achieved in this way.

More precisely, said control means are configured to provide regulation by pulse width modulation of the optical power of said laser beams 7, 8, 9 in such a way as to achieve said additional adjustment of the optical power of said light beam 10, notably according to an attenuation factor of between 5 and 20, in particular of about 10.

In this way it is possible to adjust the color and/or the optical power of said light beam 10. Said control means comprise, for example, a microcontroller, which is not shown.

Advantageously, said attenuation means 12 are configured to vary the optical power of the light beam as a function of the orientation of a polarization of said beam or beams. In this way advantage is taken of a physical feature of laser beams, namely that they exhibit the property of being strongly polarized. For reasons of simplification, it is considered in fact that there is a ratio of 200/1 between the brightness associated with each of the two orthogonal components of the polarization of a laser beam. In this way it is possible to obtain an attenuation factor of about 200 which, combined with the attenuation factor coming from the control means, in particular from the pulse width modulation, makes it possible to reach the level of 2000 mentioned above.

According to the illustrated embodiment, said attenuation means 12 comprise means 16 of modification of the orientation of the polarization of said beam or beams and, downstream, an analyzer 17 transmitting only one of the components of the polarization of said beam or beams. In this case, the beam 10 has, before passing through the means 16 of modification of the orientation, an initial orientation 18. In FIG. 1, said means 16 of modification of the orientation of the polarization allows the beam to pass through without changing the orientation of its polarization and the orientation 13 obtained at the output of said modification means allows a transmission of approximately 100% of the beam through the analyzer 17. In FIG. 2, said means 16 of modification of the orientation of the polarization make the polarization undergo a change of orientation of the polarization according to a first angle and the orientation 14 obtained at the output of said modification means 16 allowing a transmission of 30% of the beam through the analyzer 17. In FIG. 3, said means 16 of modification of the orientation of the polarization make the polarization undergo a change of orientation in such away that the new orientation 15 obtained is orthogonally offset from the orientation of the polarization of the incident beam 10. The transmission of the beam through the analyzer 17 is therefore minimal, symbolized by the FIG. 0%.

Said means 16 of modification of the orientation of the polarization comprise, for example, liquid crystal means. Said analyzer 17 is, for example, a polarizing film.

According to a variant which is not shown in which the orientation of the polarization of the beam is not modified, the device comprises means of modification of the orientation of said analyzer in such a way as to vary a proportion of the components of the polarization of said transmitted beam or beams. Thus, it is the orientation of the analyzer, provided such that it is movable whereas it was fixed in the preceding embodiment, which determines the proportion of each of the components of the polarization that is transmitted. By varying the angular position of the analyzer through 90°, the optical power of the transmitted beam is varied from its maximum to its minimum.

This being so, according to the configuration shown, said attenuation means 12 are placed in the path of the common light beam 10. In other words, said attenuation means 12 are configured to vary the optical power of said common light beam 10. More precisely, in this case, said liquid crystal means 16 and said fixed analyzer 17 are placed in the path of the common light beam 10. Similarly, depending on the embodiment of the mobile analyzer, the latter can be situated in the path of the common light beam 10.

According to a variant which is not shown, said attenuation means 12 are placed at least partially in the path of the beams emitted by the sources 4, 5, 6, in this case between said sources 4, 5, 6 and said mirrors 11. In other words, said attenuation means 12 are configured to vary the optical power of the laser beam emitted by each of said sources 4, 5, 6. More precisely, the liquid crystal means 16 and the fixed analyzer 17 are placed between said sources 4, 5, 6 and said mirrors 11, the fixed analyzer 17 being able, as an alternative, to be downstream of said mirrors 11. Similarly, according to the embodiment having a mobile analyzer, the latter can be situated between said sources 4, 5, 6 and said mirrors 11.

Advantageously, said device comprises means, which are not shown, of indexing the orientation of the polarization of the laser beam or beams. It can be a matter of orientation references of the sources 4, 5, 6 such as ribs or flats formed on the laser diodes. Said attenuation means 12 are configured to operate taking account of said indexing. Said sources 4, 5, 6 can have the same indexing, in particular in the case where the attenuation means 12 are placed in the path of the common light beam 10, or downstream, as explained below.

Said device can furthermore comprise means of detection of ambient brightness and processing means making it possible to act on said attenuation means as a function of the ambient brightness measured by said detection means. Said means of detection of the ambient brightness comprise, for example, a light detector, such as the one modifying the display screens on the dashboard of a vehicle. Said processing means are integrated, for example, at the level of the microcontroller mentioned above.

As shown in FIG. 4 the invention also relates to an image projection system 100 comprising an emission device 1 such as described above. The projection system projection 100 furthermore comprises means 102 of forming an image from said light beam 10.

Said image forming means 102 comprise, for example, a scanning generator 110 whose function is to move the light beam 10 horizontally and vertically for the purpose of producing scanning at a frequency, notably equal to 60 Hz, as a non-limiting example. The scanning generator 110 notably comprises a scanning mirror having a micro-electromechanical system (hereafter called MEMS) upon which the light beam 10 is reflected as a scanning beam 103. Such a MEMS mirror has for example a diameter of 1 mm. The MEMS mirror is able to rotate about two axes of rotation in order to produce a scanning, for example at a the refresh frequency of 60 Hz, of a diffuser screen 111 of said image forming means 102. Said image is formed on said diffuser 111. Alternatively, the MEMS mirror can be replaced by two movable flat mirrors, the movements of which are coupled. One of these mirrors can be dedicated to scanning along a horizontal axis whilst the other mirror can be dedicated to scanning along a vertical axis.

The diffuser 111 where the image is formed can be a transparent projection screen having a complex structure for projection by transparency. Alternatively, it can be translucent. It is made, for example, from glass, notably frosted, or from polycarbonate. By way of example, the diffuser screen is of the exit pupil (Exit Pupil Expander) type. It makes it possible to have a widened observation cone. It extends in a plane traversed by the light beam, the image resulting from this scanning beam 103 being formed in the plane of a face of the diffuser screen 111.

This diffuser screen receives the scanning beam 103. It is arranged to cause dispersion of this scanning beam 103 in an angular sector, for example, equal to 30° with respect to the direction of the scanning beam 103 at the moment it strikes the diffuser screen 111. In order to do this, according to a non-limiting example, a face 112 of the diffuser screen is rough, in the sense that it comprises asperities which cause the dispersion of the scanning beam 103. The rough face 112 corresponds to the one though which the beam exits, that is to say the face upon which the image is formed.

According to another variant which is not shown, said image forming means do not comprise a scanning generator, such as previously described, but a micromirror array (also called digital micromirror system). In this configuration the image is formed at the level of the micromirror array and then projected onto the diffuser screen. In general, projection optics are placed between the array and the screen. Each micromirror corresponds to a pixel of the image. In this embodiment, the image is not formed for the first time on the diffuser screen but an image previously formed on the micromirror array is received.

It should be noted that said attenuation means 12 can be, as in the example shown, upstream of said image forming means 102. They can also be downstream. In a variant, they can be placed between the scanning generator 110 or the micromirror array, on the one hand, and the diffuser screen 111 on the other hand.

Said projection system can furthermore comprise various mirrors 104, 106, notably in the path of the scanning beam 103.

The invention also relates to a display, notably a head up display, comprising a projection system 100 according to any one of the variants described above.

Downstream of the diffuser screen 111 in the direction of movement of the light beam, said display comprises at least a semi-reflective plate 126 and a reflecting device 125 interposed in the path of the image between the diffuser screen 111 and the semi-reflective plate 126. In this figure, the path of the image is symbolized by three arrows 30 shown in dotted line which reflect on the reflection device 125 before being displayed through the semi-reflective plate 126. The latter allows an enlargement and/or, by transparency, a display of the image beyond said semi-reflective plate, notably beyond the windscreen of the equipped vehicle, at the level of a virtual screen 130, obtained with the help of said semi-reflective plate 126.

This transparent plate has a reflection power at least equal to 20%, which allows the user to see the route taken by the vehicle through the plate, whilst benefiting from a high contrast making it possible to see the displayed image. Alternatively, the display of the image can take place on the windscreen of the vehicle equipped with said display.

As already stated, said attenuation means can be situated downstream of the image forming device 102 and as far as the semi-reflective plate 126.

The invention claimed is:

1. A device for emitting a light beam intended to form an image, said device comprising:
    a plurality of sources generating a plurality of laser beams, said device being configured to form said light beam from the plurality of laser beams by combination;
    control means configured to provide pulse width modulation of supply currents of said plurality of sources for varying optical power of the light beam by a first attenuation factor between 5 and 20;
    attenuation means, situated downstream of said plurality of sources for further varying the optical power of the light beam by a second attenuation factor between 100 and 300, the attenuation means comprising:
        means of modification of an orientation of a polarization of said laser beams, and
        an analyzer, downstream of the means of modification, that transmits only one component of the polarization of said laser beams;
    a diffuser, downstream from the attenuation means, that disperses the light beam; and
    a display that receives the dispersed light beam,
    wherein each beam of the plurality of beams is parallel to each other beam of the plurality of beams before combination, and
    wherein the first attenuation factor and the second attenuation factor are combined to adjust a brightness of the image from a day time driving condition to a night time driving condition.

2. The device as claimed in claim 1, wherein said attenuation means are configured to vary the optical power of the light beam as a function of an orientation of a polarization of the laser beams.

3. The device as claimed in claim 2, wherein said attenuation means comprise an analyzer transmitting only one component of the polarization of said laser beams and means of modification of the orientation of said analyzer for varying a proportion of the components of the polarization of said transmitted laser beams.

4. The device as claimed in claim 1, wherein said analyzer is fixed.

5. The device as claimed in claim 1, wherein said means of modification of the orientation of the polarization comprise liquid crystal means.

6. The device as claimed in claim 1, wherein said control means are configured to provide linear current regulation of the optical power of said laser beams to provide a choice of color of the light beam according to a proportion of optical power allocated to each of said laser beams.

7. The device as claimed in claim 1, wherein said attenuation means are configured to vary the optical power of at least one of said laser beams before the at least one laser beam is combined with at least one of said other laser beams.

8. The device as claimed in claim 1, wherein said device comprises means of indexing the orientation of the polarization of the laser beams and wherein said attenuation means are configured to operate taking account of said indexing.

9. The device as claimed in claim 8, wherein said plurality of sources have the same indexing.

10. The device as claimed in claim 1, further comprising means of detecting ambient brightness and processing means for acting on said attenuation means as a function of the ambient brightness measured by said detection means.

11. An image projection system comprising a device as claimed in claim 1.

12. The system as claimed in claim 11, further comprising means for forming an image from said light beam, wherein said attenuation means are situated downstream of said image forming means.

13. A head up display, comprising at least an image projection system as claimed in claim 11.

14. A method for emitting a light beam intended for forming an image, comprising:
generating, by each of a plurality of sources, a plurality of laser beams, wherein said light beam is formed by combining said plurality of laser beams together, wherein each beam of the plurality of beams is parallel to each other beam of the plurality of beams before combination;
reducing, in response to a change from a daytime driving condition to a night driving condition, optical power of the light beam using control means to provide pulse width modulation of supply currents of said plurality of sources;
further reducing, in response to the change from the daytime driving condition to the night driving condition, the optical power of said light beam using attenuation means situated downstream of said one or more sources, the attenuation means comprising:
means of modification of the orientation of a polarization of said laser beams, and
an analyzer, downstream of the means of modification, that transmits only one component of the polarization of said laser beams;
diffusing, by a diffuser, said light beam after varying the optical power; and
receiving, by a display, the diffused light beam.

15. The method as claimed in claim 14, wherein additional adjustment of the optical power of said light beam is provided using means for controlling the current supply of said plurality of sources.

* * * * *